Sept. 30, 1958 H. L. BROVERMAN 2,854,570

REMOTE MONITORING AMPLIFICATION

Filed Dec. 30, 1954 2 Sheets-Sheet 1

INVENTOR.

HOWARD L. BROVERMAN

BY

Connolly and Hutz

HIS ATTORNEYS

Sept. 30, 1958 H. L. BROVERMAN 2,854,570

REMOTE MONITORING AMPLIFICATION

Filed Dec. 30, 1954 2 Sheets-Sheet 2

INVENTOR.

HOWARD L. BROVERMAN

BY

Connolly and Hutz

HIS ATTORNEYS

United States Patent Office 2,854,570
Patented Sept. 30, 1958

2,854,570

REMOTE MONITORING AMPLIFICATION

Howard L. Broverman, Pittsfield, Mass., assignor to Sprague Electric Company, North Adams, Mass., a corporation of Massachusetts Application December 30, 1954, Serial No. 478,683

1 Claim. (Cl. 250—20)

This invention relates to amplification arrangements, more particularly to such arrangements that are suitable for use in remote monitoring system.

In prior Patent No. 2,574,458, granted November 13, 1951, there is described a monitoring system by which outages on a power transmission line, many miles in length, can be readily located by a locally positioned monitoring unit. As explained in that patent, such a unit includes a local carrier wave generator connected to locally deliver the carrier waves to the transmission line, and a plurality of remotely located modulators connected to spaced locations on the line, each having a different modulating frequency. The monitoring unit detects and indicates the presence of the remotely applied modulation and thereby shows by the absence of any or all of these modulation signals, where the line outage is located.

Among the objects of the present invention is the provision of an amplification arrangement that is highly effective for use with the above monitoring system.

The above as well as additional objects of the present invention will be more clearly understood from the following description of several of its exemplifications, reference being made to the accompanying drawings wherein.

It has been discovered that a much more effective amplification of the signals to be monitored is obtained by using an amplitude discriminating stage connected to receive the incoming waves, select only the peaks of these waves and deliver these peaks to an amplifier-demodulation network connected to amplify these peaks, then demodulate the amplified peaks, and further amplify the demodulated signals. The amplitude discriminating stage can include a translating circuit biased to cut-off, so that it transmits only those portions of the upper and lower peaks of the waves that have an amplitude sufficient to overcome the effects of the bias. Although the bias can be provided from an external source, the preferred manner is by a self-biasing arrangement which is extremely stable and insensitive to minor changes in average carrier amplitude. The translating circuit can be operated with diodes, or translating units that have a separate control electrode in addition to output electrodes. Furthermore, these units can be connected either in parallel and oppositely poled, or in push-pull.

The receiving apparatus should have a high frequency amplification circuit connected to amplify the selected peaks by at least 30 decibels, and after demodulation a further amplification circuit connected to amplify the demodulated signal by at least 30 additional decibels. With this type of arrangement a very simple, inexpensive and reliable monitoring system can be operated with ranges of 100 miles or more on low voltage distribution lines.

Figure 1:
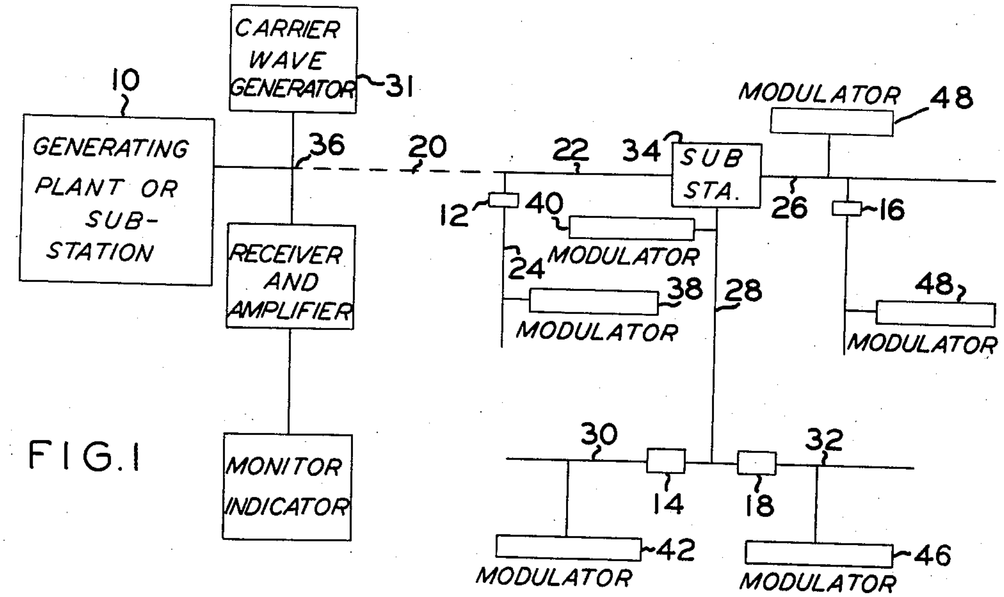
Fig. 1 is a schematic representation of a remote monitoring system incorporating the present invention.

Referring specifically to Fig. 1, there is here shown an electric power transmission system in which a generating plant 10, or other power source, is connected to a power transmission and distribution system consisting of conductors indicated at 20, 22, 24, 26, 28, 30 and 32. A substation is shown at 34 for transforming the voltage supplied by conductor 20 to a value more suitable for further transmission or distribution. Line clearing devices such as conventional rapidly acting circuit breakers may also be connected in the line, as shown at 12, 14, 16 and 18 to open the line circuit in the event of a short in the portion of the line on the load side of a breaker.

The remote monitoring system is applied to the transmission line system of Fig. 1, by connecting to the line at some convenient monitoring location, as at 36, a combination high frequency carrier supply and monitor. At points where it is desired to monitor the presence or absence of line voltage on the conductor, there are also connected to the line individual modulators represented at 38, 40, 42, 44, 46, and 48.

As described in the above-identified patent, the monitoring system functions by causing the line to carry the high frequency carrier waves applied by a source such as generator 31 and causing the modulators to each impress a different low frequency rate of amplitude modulation on the carrier waves. At the monitoring location 36 the presence of each of these individual modulation frequencies is detected and separately indicated. In the event of a line outage, such as an open circuit due to the operation of a breaker, the modulations of modulators in the de-energized portions of the line will no longer be received at the monitor. Thus, if the monitor suddenly shows the absence of the modulation of modulator 42, for example, while indicating the presence of the other modulations, it would be clear that an outage exists on section 30. If desired, additional modulators can be used to reduce the length of individual line sections being monitored.

As indicated in Fig. 1, a line conductor may be used as the monitor line, the carrier being impressed between this line conductor and ground or earth. In such case the ground functions as a second line conductor. If desired, however, the carrier can be impressed between a pair of line conductors that are not grounded. This pair of conductors may constitute a complete single phase transmission line, or may be part of a multiconductor or multiphase line.

The carrier and modulating frequencies are selected so as not to unduly interfere with the normal functions of the line or with established communication frequency channels. It has been found that a carrier frequency of about 30,000 to about 150,000 cycles per second, and modulation frequencies of from about 200 to about 10,000 or more cycles per second are highly satisfactory with power lines carrying the standard 60 cycle-per-second electric power.

Figure 2:
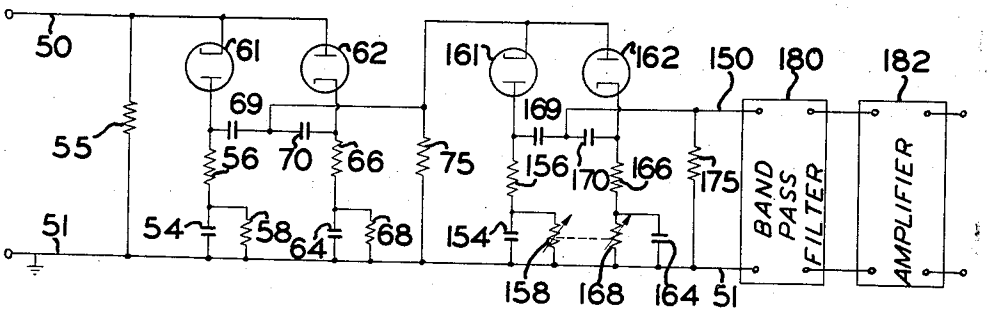
Fig. 2 is a circuit diagram, partly in block form of a portion of a receiving apparatus according to the present invention.

Fig. 2 shows in detail the essential elements of one form of amplitude-discriminator circuit in accordance with the present invention, as well as its connection in the combination. Input leads 50, 51 can be directly coupled to the line and ground, respectively, as by means of a series coupling capacitor in lead 50. A series resistor can also be placed in this lead ahead of the coupling capacitor to reduce the potential across the coupling capacitor if desired. An input load resistor 55 is connected between the lines 50, 51 and the incoming waves are impressed across it.

Also connected between lines 50, 51 are a first pair of diodes 61, 62. The diode 61 has its cathode led directly to line 50, its anode being led through two resistors 56, 58 to line 51. Resistor 58 is by-passed by a capacitor 54. Diode 62 is similarly connected with a corresponding set of resistors 66, 68, and capacitor 64. However, diode 62 is oppositely poled, its anode going to the line 10, and its cathode to line 51.

The modulated carrier waves appearing across the resistor 55 are impressed across both diodes 61, 62. Diode 61, considered by itself, tends to become conductive only for those lobes or pulsations of the incoming waves which render its cathode negative with respect to its anode. However, after a very few of these lobes have caused current to pass one way through this diode, a D. C. voltage is built up across capacitor 54 from the D. C. potentials developed in resistor 58. The polarity of this D. C. voltage is such that its ungrounded terminal becomes negative with respect to its grounded terminal.

This D. C. voltage appears across the electrodes of diode 61, biasing its anode negative with respect to its cathode. As a result its cathode has to be raised to higher negative voltage before the diode becomes conductive. The values of the resistors and capacitor are selected so that after the first few lobes of the waves, the diode only conducts when the negative lobes at lead 50 are close to their peaks, that is approach the range of the modulation limits.

Figure 3:
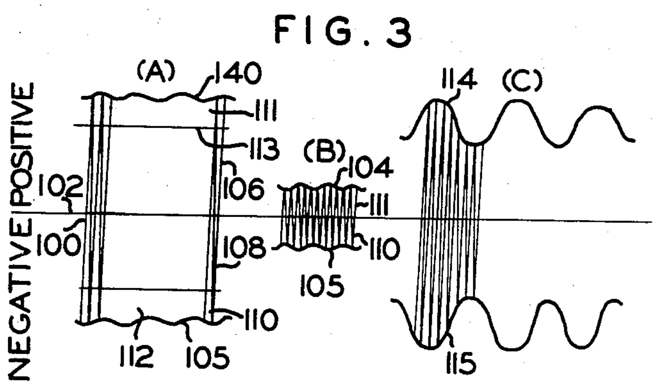
Fig. 3 is a group of curve diagrams illustrating the operation of the apparatus of Fig. 2.

The above action is more clearly shown in Fig. 3, which represents in its left-hand portion (A) the waves so they appear on conductor 50. These waves are indicated at 100 and oscillate in the positive and negative direction with respect to the zero potential axis 102. Their limits of oscillation trace out a modulation signal or envelope represented by the lines 104, 105. The amplitude of the waves in either one of these lines indicates the intensity of the signal that is to be monitored.

The lower or negative pulses 108 of the waves 100 are the only ones that tend to make diode 61 conductive as explained above. However, the development of the above-described bias causes the conductivity to be limited to the most negative portions 110 of the negative pulses. This is represented by the line 112 which indicates the operating level of the self bias.

Accordingly, the only portions of the incoming waves transmitted through diode 61 is the portion 110. This portion appears between anode of diode 61 and ground lead 51. Since the capacitor 54 is of relatively low impedance, this voltage is substantially entirely across resistor 56.

A corresponding operation takes place with diode 62, but because of its opposite polarity, only the positive lobes are affected and the portions 111 of these lobes above the bias line 113 are transmitted to its output load resistor 66. Coupling capacitors 69, 70 carry the separate wave portions 110, 111 to a common output resistor 75 where they now appear in the manner shown in the central portion (B), of Fig. 3. Although the overall amplitude of the high frequency waves is now much smaller, the amplitude of the modulation waves 104, 105 is substantially the same as before. If the waves of Fig. 3(B) are now amplified to the overall intensity of the original waves of Fig. 3(A). They will be in the general form shown in Fig. 3(C) and their modulation envelope 114, 115 will have an amplitude many times larger than before. Accordingly, upon demodulation, a much larger signal will be directly obtained and the background noise level will be appreciably lower.

Best results are obtained by adjusting the bias levels 112, 113 as close as possible to the minimum points of the modulation curves 104, 105, that is, the points closest to the zero line 102. Such adjustment can be made by suitable selection of the bias-controlling resistors 58, 68. However, when the original amplitude of the modulation waves 104, 105 is very small, as in the outage monitoring system, it is preferable to use two stages of amplitude discrimination. The first stage can then make a coarse selection, operating in the manner shown in Fig. 3 for example and the second stage then making a fine discrimination to cause it to come very close to the minimum points of waves 104, 105 in the curves shown in Fig. 3(B). Inasmuch as a change in bias of a fraction of a volt will be a much larger proportion of the overall signal potential for the waves of Fig. 3(B) than for the waves of Fig. 3(A), the fine adjustment is more readily obtained by this kind of two stage operation.

Fig. 2 shows the two stage combination provided by having the output resistor 75 connected to a second pair of diodes 161, 162 each include a network having resistors 156, 158, 166, 168 and capacitor 154, 164, as in the first stage. As shown resistors 158, 168 which control the bias in the second stage can be made adjustable whereas the corresponding resistors of the first stage can be left fixed. By suitable adjustment of the resistors 158, 168 the final discrimination can be brought very close to the minimum points of the modulation waves, to produce an output having practically 100% modulation. As with the first stage coupling capacitors 169, 170 can be connected to combine the discrimated output of diodes 161, 162 at a common load resistor 175.

The output signals of the discriminator stage or stages will tend to have some harmonic distortion, apparently because the wave portions 110, 111 when recombined do not present perfectly sinusoidal form. This distortion is generally of relatively low amplitude and will not seriously interfere with the operation of the apparatus. However, if desired the signals can be passed through a band pass filter 180 which can merely be a parallel-resonant circuit shunted between the signal conductors 150, 151 and tuned to the carrier frequency. Alternatively, a plurality of such resonant circuits can be used and can be coupled together as in the form of a standard high frequency transformer having the desired band pass characteristics. The signals delivered by the filter 180 can be amplified as in the amplifier 182 which can also include a demodulator. The signals can be given an amplification of 30 to 60 decibels before demodulation and another amplification of 30 to 60 decibels after demodulation. This will bring the monitor signals to a convenient level where they can be fed to indicator circuits or otherwise used as described in the above-identified patent.

A feature of the present invention is that it makes available a gain of about 50 decibels in the modulation waves 114, 115 compared to the waves 104, 105 as received in the outage monitoring systems. This gain is obtained with very little noise increase so that the operation of the entire system becomes more reliable and its range can be considerably extended as indicated above.

The units 61, 62 of any discriminating stage need not be connected in parallel as in Fig. 2 but can be connected in push-pull if desired. The incoming waves can then be supplied on conductors neither of which are grounded, as by means of an input transformer if necessary. The output windings of the input transformer can be arranged to deliver signals that are balanced with respect to ground, each end of the winding being connected to an anode of a different diode for example, with the other electrodes of the diodes returned to ground through the resistor-capacitor combination as shown in Fig. 2.

Figures 4, 5:
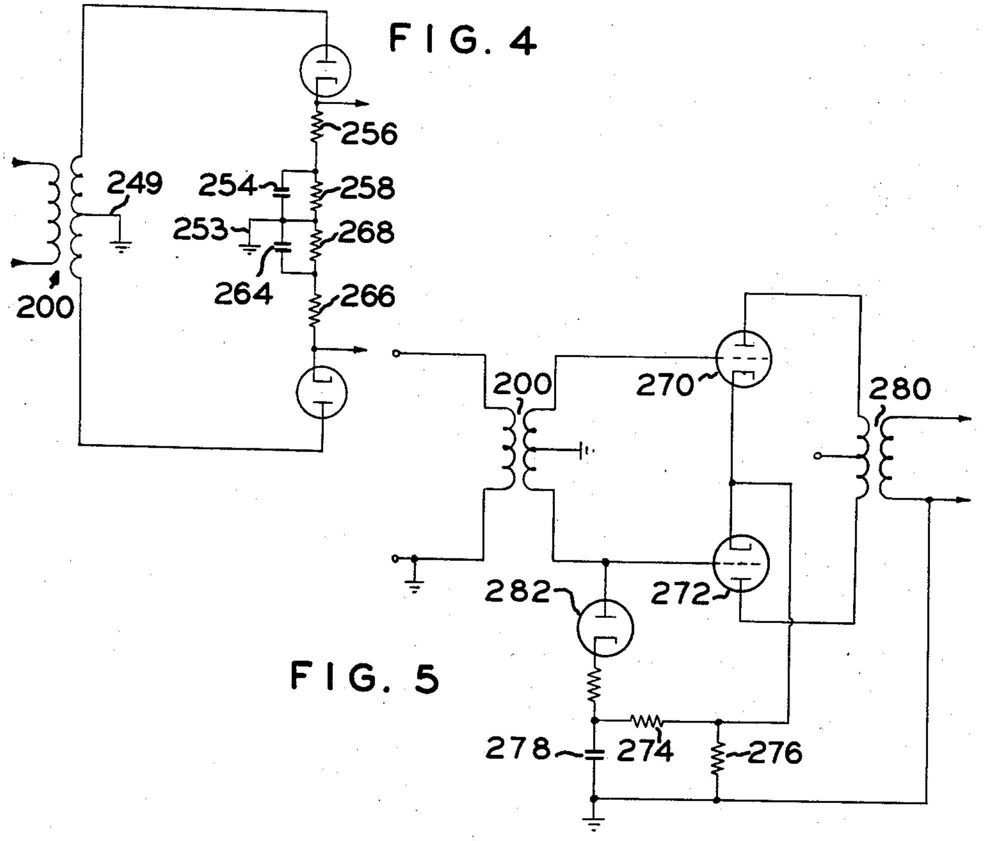
Figs. 4 and 5 are circuit diagrams of alternative modifications of a portion of the circuit shown in Fig. 2, both in accordance with the present invention.

Fig. 4 illustrates this type of operation, the input transformer being shown at 200, the diodes at 261, 262, the resistors at 256, 258, 266, 268, and the capacitors at 254, and 264. The circuits are completed by the ground connections 249, 253. As before, the output is taken from the high potential ends of resistor 256, 266 as indicated by the leads 269, 270.

Where the incoming signals supplied by transformer 200 are fairly well balanced with respect to ground the circuit of Fig. 4 can be further simplified by using a single bias resistor through which both resistors 256, 266 return to ground. The common bias resistor or the separate bias resistors 258, 268 if they are used, can be of fixed resistance as in the first stage of the circuit of Fig. 2, or adjustable as in the second stage, and two stages can be cascaded as in Fig. 2. Alternatively, the diodes can have their electrodes reversed so that the transformer is connected to their cathodes and the anodes returned through the resistor-capacitor network to ground.

Instead of using diodes as in the circuit of Fig. 4, translating units having a control electrode in addition to output electrodes can also be used. Thus a transistor, or a vacuum tube triode, pentode or tetrode can be substituted in place of each of the diodes in Fig. 4, such as in Fig. 5 wherein triodes are used. With such substitution the bias voltage is applied to the control electrode in order to effect the desired discrimination. The input transformer is again shown at 200, the triodes at 271, 272, the bias controlling resistors at 274, 276, the capacitor at 278, the output transformer at 280 and the bias diode at 282. The bias diode 282 supplies a bias proportional to the input of transformer 200 which drives the push-pull triodes 270, 272, and biases both diodes to cut off thus allowing the peaks of the modulated carrier to pass to further stages. It is not necessary to exclude the bias voltage from the electrodes other than the control electrodes inasmuch as the other electrode have very little influence over the conduction conditions which are determined by the control electrode.

The diodes or triodes, tetrodes, etc., can either be entirely separate units or two or more can be combined in a single envelope. The diodes themselves can either be of the vacuum tube kind or the semiconductor variety such as the selenium or germanium rectifiers.

The amplification shown in Fig. 2 as following the second discriminator stage, can if desired be separated into two different amplification treatments one following the first discriminator stage and one following the second.

In order to more readily enable others to use the invention, there is given below the circuit constants of an effective embodiment of the circuit of Fig. 2. However, this is not to be understood as limiting the invention in any way.

Capacitors 54, 154, 64, 164, 69, 169, 70 and 170 are all 0.01 mfd.

Resistor 55—47,000 ohms.
Resistors 56, 156, 66, 166 are all 1500 ohms.
Resistors 58, 68—2.2 ($10^6$) ohms.
Resistors 75, 175—10,000 ohms.
Resistors 158, 168—2.5 ($10^6$) ohm potentiometers.
Diodes 61, 62 are each ½ of a 6AL5.
Diodes 161, 162 are each ½ of a 6AL5.
Input frequency range—50–120 kilocycles.
Input level—3.0–300 volts.
Required output level—about 5 mv.

Modulation frequency—above 200 C. P. S.
Typical operating conditions:
(1) Input—88 kilocycles carrier, modulated 0.1% at 400 C. P. S., 25 volts input. Output—10 mv. modulated 30%.
(2) Input—300 volts carrier modulated .001% at 400 C. P. S. Output—10 mv. modulated 0.3%.

As many apparently widely different embodiments of this invention may be made without departing from the spirit and scope hereof, it is to be understood that the invention is not limited to the specific embodiments hereof except as defined in the appended claim.

What is claimed is:

A receiving apparatus for receiving and strongly amplifying signals that are carried by carrier waves at a low degree of modulation having in combination a first amplitude discriminating stage connected to receive incoming carrier waves, said first amplitude discriminating stage consisting of a first pair of diodes connected in parallel but oppositely poled, an electrode of each connected to signal and another electrode of each connected to ground through a capacitor and resistor in parallel circuit and a series resistor, a pair of coupling capacitors connected in series between said diodes whereby the peaks of the carrier waves are selected and impressed across the respective coupled capacitors, a common output resistor center tap connected to said coupling capacitors, a second amplitude discriminating stage consisting of a second pair of diodes connected in parallel but oppositely poled, an electrode of each of said diodes connected to said common output resistor and said coupling capacitors, an electrode of each of said diodes connected to ground through a capacitor and variable resistor in parallel circuit and a resistor in series, a pair of coupling capacitors connected across said capacitor resistor circuits to combine the discriminated output of the said second diodes whereby the peaks may be selected and the minimum points of the waves brought close together whereby the selected peaks of the incoming carrier waves are amplified and means for demodulating the amplified peaks to detect the signal and further amplify the demodulated signals.

References Cited in the file of this patent

UNITED STATES PATENTS

| | | |
|---|---|---|
| 1,859,565 | Keith | May 24, 1932 |
| 1,875,157 | Roberts | Aug. 30, 1932 |
| 1,976,457 | Ohl | Oct. 9, 1934 |
| 2,403,245 | Slaymaker | July 2, 1946 |
| 2,422,766 | Alexander | June 24, 1947 |
| 2,437,839 | Slaymaker | Mar. 16, 1948 |
| 2,453,958 | Andresen | Nov. 16, 1948 |
| 2,580,052 | Torre et al. | Dec. 25, 1951 |
| 2,652,541 | Cutler | Sept. 15, 1953 |
| 2,739,191 | Wisenbaker et al. | Mar. 20, 1956 |